Figure 5:
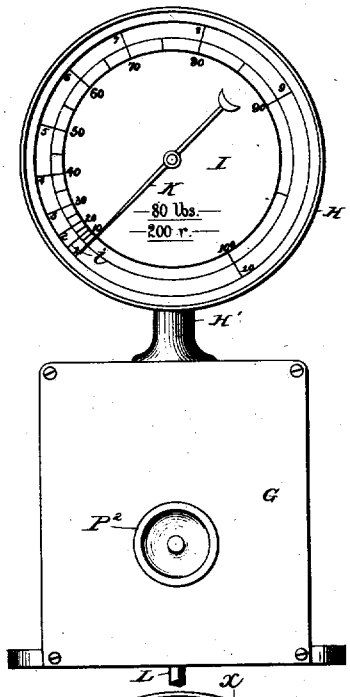

2 Sheets—Sheet 1.
A. L. IDE.
STEAM ENGINE INDICATOR.
No. 10,918. Reissued Apr. 3, 1888.
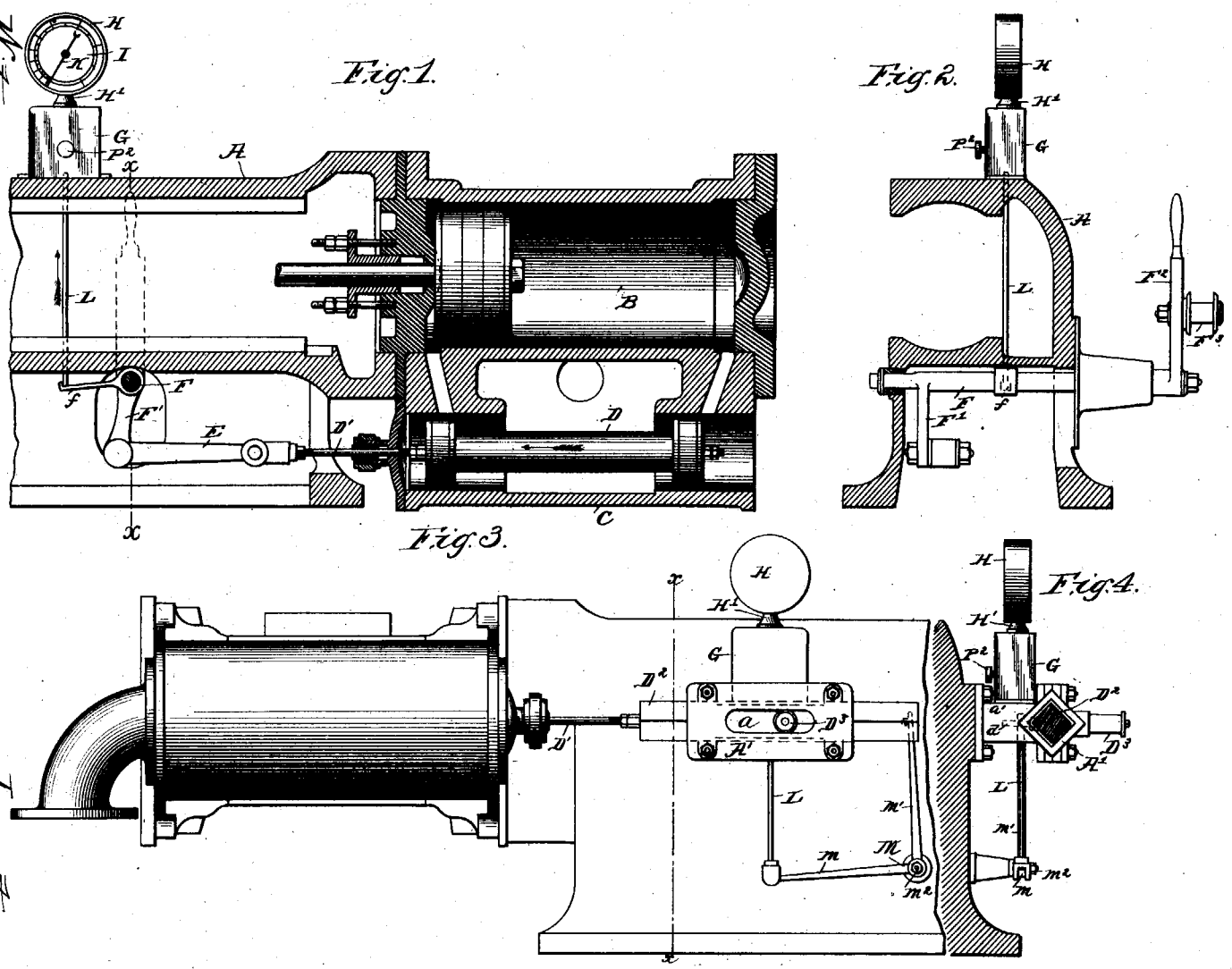
Witnesses
Wm. Rheem.
Wm. F. Henning.
Inventor.
Albert L. Ide
By Clayton, Poole & Brown
Atty's.
N. PETERS, Photo-Lithographer, Washington, D. C.

2 Sheets—Sheet 2.

A. L. IDE.

STEAM ENGINE INDICATOR.

No. 10,918. Reissued Apr. 3, 1888.

Witnesses.

Wm. Rheims.

Wm. J. Henning.

Inventor.

Albert L. Ide

By Clayton, Poole & Brown,

Atty's.

N. PETERS, Photo-Lithographer, Washington, D. C.

UNITED STATES PATENT OFFICE.

ALBERT L. IDE, OF SPRINGFIELD, ILLINOIS.

STEAM-ENGINE INDICATOR.

SPECIFICATION forming part of Reissued Letters Patent No. 10,918, dated April 3, 1888.

Original No. 375,874, dated January 3, 1888. Application for reissue filed March 12, 1888. Serial No. 267,056.

*To all whom it may concern:*

Be it known that I, ALBERT L. IDE, of Springfield, in the county of Sangamon and State of Illinois, have invented certain new and useful Improvements in Steam-Engine Indicators; and I do hereby declare that the following is a full, clear, and exact description thereof, reference being had to the accompanying drawings, and to the letters of reference marked thereon, which form a part of this specification.

This invention relates to valve-indicators for steam-engines, the indicator herein shown being more especially intended for that class of steam-engines having automatic cut-off mechanism for using steam expansively.

The invention consists in the matters hereinafter described, and pointed out in the appended claims.

In a prior patent, No. 343,032, granted to me upon the 1st day of June, 1886, is shown and described a valve-indicator for steam-engines which is operated by the movements of the valve, and which is constructed to show by the movements of the index-hand or pointer upon a suitably-divided scale the quantity of steam in the cylinder at the time the steam-supply is cut off. As shown and described in said patent, the index-hand or pointer of the indicator is movably supported upon the engine-frame, and is actuated by a moving part connected with the valve, which moving part is provided with two separate projections or stops adapted to engage and move the said index-hand alternately in opposite directions. Said projections or stops are located at a considerable distance apart, so that the hand will be carried to one end or side of the scale by one stop and there allowed to remain until engaged and moved backwardly by the other stop in the return movement of the valve. By this construction the hand obviously remains stationary at the extreme limits of the movement given to it by the stops during a considerable part of each stroke, thereby giving ample time to the observer to note the extent of the movement upon the scale. The scale shown in said prior patent is laid off from a central zero-mark in the middle of the scale to indicate the extent of travel in the valve from its position when the ports begin to open to the extreme limit of its stroke, the stops being placed at such distance apart that the index-hand will remain stationary upon the zero-mark, except when the valve is moved sufficiently to admit steam to the cylinder, the graduations at each side of said zero-mark indicating the extent of movement of the valve while open, and consequently the quantity of live steam admitted to the cylinder at each stroke of the piston.

A valve-indicator constructed in accordance with the present invention is operated by the contact with a movable index-hand or scale of a movable part which is connected and moved with the valve generally in the manner set forth in said prior patent. In the present invention, however, the index-hand, instead of being moved alternately in opposite directions by the action of the movable part connected with the valve, is turned or moved in one direction only by the direct action of said movable part connected with the valve, and is moved or turned in the opposite direction by the action of gravity or of a suitably-applied weight or spring, suitable means being provided for controlling the movement of the index-hand, so that the latter shall move slowly backward toward the zero-point of the scale, so that in an engine running at the usual or at a high speed the index-hand or pointer will not have time to move backwardly to any considerable extent between any two forward movements of the valve, but will remain practically immovable at the point of the scale to which it is carried by the valve, while at the same time said index-hand will quickly and closely follow changes in the throw of the valve, as will hereinafter more fully appear.

I have herein shown an index-hand as arranged to rotate and move over a circular scale, and a spring assisted by the gravity of certain of the working parts as employed to turn the index-hand backwardly to the zero-point of the scale.

As a means of checking the rapid movement of the index-hand, so as to prevent the latter from following the movable part connected with the valve in the movements of the latter, I have herein shown a dash-pot as interposed in the operative parts between the valve and the indicator-hand. It will readily be understood, however, that an equivalent frictional retarding device or speed-regulator—such as a train of gears actuating a fan—may be employed with the same general result as is obtained by the use of the dash-pot. It will be understood, furthermore, that the same general result herein described may be produced by a construction in which the index-hand is moved over a straight scale in the manner set forth in said prior patent above referred to, or by one in which the scale is moved and the index-hand is stationary.

As a further improvement in valve-indicators, which is applicable to the index-hand-moving devices shown in the prior patent, as well as to the particular ones herein shown, I provide a scale which is marked to indicate the horse-power developed when the hand is in a certain position upon the scale. It will of course be understood that with steam at a certain definite pressure, and when the engine is running at a certain speed, the horse-power developed by the engine will depend upon the number of inches of steam in the cylinder at the point of cut off. It follows that, either by calculation or experiment, a scale may be made which will indicate the horse-power exerted when the valve is at several points of cut-off. A scale thus made for indicating the horse-power will, however, only be accurate for a certain definite steam-pressure and a certain piston-speed; but by preparing a number of scales indicating horse-power to correspond with several degrees of steam-pressure a horse-power indicator may be made which will practically show the approximate power developed with any steam-pressure commonly used and when the engine is running at any given speed or the regular speed at which the engine is designed to run. Inasmuch as a scale marked to indicate horse-power, when employed in connection with an index-hand showing the inches of steam in the cylinder at the point of cut-off, is novel, an indicator comprising such scale and index-hand is herein broadly claimed as my invention without restriction to the particular means shown for actuating the said index-hand from the valve.

The invention may be more readily understood by reference to the accompanying drawings, in which—

Figure 10:
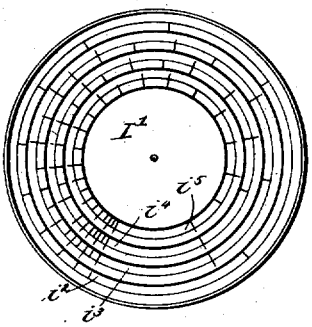
Figure 8:
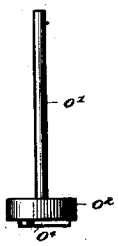
Figure 9:
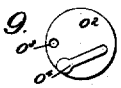
Figure 6:
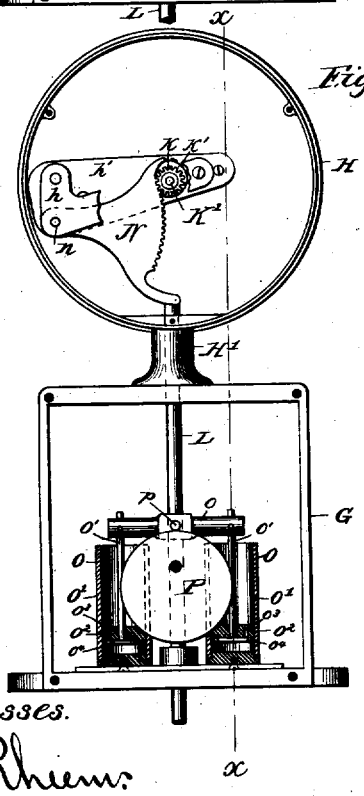
Figure 7:
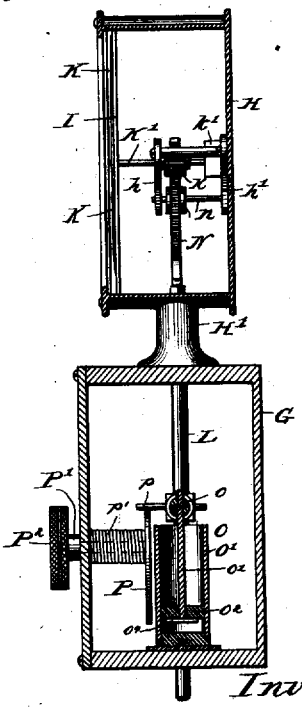

Figure 1 is a sectional view through the cylinder and valve-chest of a steam-engine, showing the valve-indicator and connecting devices between the same and the valve in elevation. Fig. 2 is a sectional elevation of the same taken upon line *x x* of Fig. 1. Fig. 3 is a side elevation of a steam-cylinder and valve-chest, showing a somewhat different arrangement of the valve-indicator upon the engine-frame. Fig. 4 is a sectional elevation of the same taken upon line *x x* of Fig. 3. Fig 5 is an enlarged face view of the exterior casing of the indicator, showing the dial and index-hand. Fig. 6 is a view of the same with the dial and the front wall of the casing removed, showing certain of the parts within the casing in section. Fig. 7 is a sectional elevation taken upon line *x x* of Fig. 6. Fig. 8 is a view of one of the pistons of the dash-pot shown in Figs. 6 and 7 detached from the other parts. Fig. 9 is a view of the lower surface of the piston shown in Fig. 8. Fig. 10 is a view of a dial-face graduated somewhat differently from that shown in Fig. 5.

As shown in said drawings, Figs. 1 and 2, A indicates a part of the frame of the engine; B, the steam-cylinder; C, the steam-chest; D, the valve; D′, the valve-rod; E, the valve-connecting rod, and F a rock-shaft provided with an arm, F′, which is connected with the rod E, said rock-shaft being connected with and moved by the engine-eccentric—as, for instance, by the usual eccentric connected with a rigid arm, $F^2$, upon the rock-shaft F by means of a pivot-pin, $F^3$, upon said arm.

G indicates the box or casing containing some of the operative parts of the indicator, and H a second box or casing mounted upon the casing G and provided with a dial-plate, I, over which moves an index-hand K.

L is a vertical rod, by means of which, in the particular apparatus shown, motion is transmitted from the rock-shaft F to the indicator. As shown in said Figs. 1 and 2, the rod L engages at its lower end a horizontal arm, *f*, attached to the rock-shaft F. As the said rock-shaft is oscillated in the vibratory motion of the valve, the rod L is lifted by the action of the arm *f*, the motion of the said rod being communicated to the index-hand K, and said rod being retained from falling freely, and thus following the rapid movements of the arm *f*, in a manner hereinafter described. Said Figs. 1 and 2 show an apparatus attached to the top of the engine-frame A, and a rod, L, as passing downwardly through suitable vertical guide-apertures in the frame to a point horizontally opposite the rock-shaft F, which latter is located transversely beneath the cross-head guides of the frame.

In Figs. 3 and 4 I have shown the indicating device as applied to an engine in which the valve-chest is located at one side of instead of beneath the steam-cylinder. In this case the valve D′ is shown as secured to a slide-rod, $D^2$, moving in the guide A′ upon the engine-frame, the said slide $D^2$ being provided with a pivot-pin, $D^3$, passing outwardly through a slot, *a*, in the guide A′ in suitable position for engagement with the end of the eccentric-rod. In this instance the indicator-casing is mounted upon the top of the arm *a*′, which supports the guide A′, and the vertical rod L passes through a guide-aperture in the said part *a*′. The lower end of said rod L is located over the free end of a horizontal arm, *m*, of a bell-crank lever, M, which latter is pivoted at $m^2$ upon the engine-frame, and is provided with a vertical arm, *m*′, adapted for engagement with a pin or stop, *d*, upon the slide $D^2$. In this construction, as the slide $D^2$ is reciprocated, its motion is transmitted to the bell-crank lever M, the horizontal arm *m* of which acts to throw the rod L upwardly, and thereby actuate the indicator in substantially the same manner as the form of device shown in Figs. 1 and 2.

The particular devices herein shown for communicating motion from the vertically-sliding rod L to the index-hand K are made as follows: Said index-hand is mounted upon a horizontal shaft, K′, which is supported in suitable bearing-plates, *h h′*, within the casing H. Upon the said shaft is fixed a pinion, *k*, adapted to intermesh with a segmental rack, N, pivoted at *n* to the plates *h h′*. A spiral spring, *k′*, is attached at one end of the shaft K′ and at its opposite end to the plate *h′*, said spring tending to turn the shaft in a direction to throw the index-hand toward the zero-point of the scale. The segmental rack N is so arranged that when the said arm is at its lower limit of its movement the said index-hand will be at the zero-point. The weight of the said rack thereby aids the spring in giving the backward movement to the index-hand. The rod L is constructed to slide freely through the standard H′, connecting the case H with the case G, and the upper end of said rod presses against the lower end of the segmental rack N, so that when the rod is lifted the rack will be thrust upwardly and the index-hand thereby turned to carry it away from the zero-point. It follows from this construction that any upward movement of the rod L will be immediately transmitted to the index-hand, and will move the latter to an extent depending upon the degree of upward movement of the rod.

Devices for preventing the falling of the rod by gravity in the descent of the movable part which actuates said rod, except with a slow motion, are herein shown as located within the case G and as made as follows: O O are two dash-pots, consisting of cylinders O′, open at their upper ends and attached at their lower ends to the base of the said casing G. These cylinders are arranged at opposite sides of the rod L, and attached to said rod is a cross-bar, *o*, to the opposite ends of which are connected two piston-rods, *o′ o′*, having upon their lower ends pistons $o^2$ $o^2$, fitting the cylinders O′ O′. The said pistons $o^2$ are provided with apertures $o^3$, covered by downwardly-opening flaps $o^4$, as clearly shown in Figs. 6, 8, and 9. Said cylinders O′ O′ contain a fluid substance, preferably glycerine. When the rod L is thrust upwardly, the fluid passes downwardly through the openings $o^2$ $o^2$, thereby allowing the pistons to freely rise in the cylinders. The pistons are fitted somewhat loosely in the cylinders, so as to allow a small escape of fluid past the pistons, and the descent of the rod under its own weight and the action of the spring *k′* and the weight of the segment N takes place only as fast as permitted by the escape of the fluid upwardly past the said pistons. It follows from this construction that the said rod L will be free to quickly rise when struck by the arm *f* of the rock-shaft F or other movable part partaking of the movements of the valve, but will descend very slowly, so that its motion between any two reciprocations of the valve will be slight, and when the valve moves continuously with the same throw the index-hand will remain practically stationary. As soon, however, as the throw of the valve is lessened or increased, the index-hands and rod L will fall or rise to correspond with the extent of the change in the throw of the valve.

In order to enable the indicating device to be thrown out of action when desired, I have herein shown the rod L as provided within the case G with a horizontal pin, *p*, adapted to engage the upper surface of an eccentric, P, attached to a shaft, P′, which is mounted in the wall of the casing and provided exterior to the casing with a milled head, $P^2$, which may be turned for rotating the said eccentric, and thereby lifting the rod L to a point where it is free from contact with the moving part connected with the valve. A spiral spring, *p′*, is herein shown as placed about the shaft P′ between the wall of the casing G and the adjacent face of the eccentric P, said spring being for the purpose of holding the eccentric at the point to which it is turned.

The dial I, over which the index-hand moves, is desirably provided with a scale or marking, *i*, indicating the number of inches of steam in the cylinder at the point of cut-off. As a further improvement in indicators, I provide said dial with a scale, *i*, divided and numbered to indicate the horse-power developed by the engine at a definite pressure of steam in the boiler and with a certain speed of the engine, it being entirely obvious that the horse-power developed with a certain steam-pressure and with a certain piston-speed or rate of travel of the piston will always be the same when the valve is moving so as to cut off steam at a certain point in the cylinder. In other words, the dial is graduated to indicate the horse-power when the engine is running at a given number of revolutions and with a given steam-pressure. It follows that when, in connection with an index-hand which is moved by a part partaking of the movements of the valve, a graduated scale is provided, which is marked, either by calculation or experiment, to indicate the points at which a certain horse-power is developed, such scale will be true for all positions of the valve when a certain pressure of steam is being carried within the boiler and the engine is running at a certain fixed speed. In practice engines are commonly designed to run at a definite or regular speed, and the dial for any particular engine will usually be marked for the speed at which the engine is designed to run.

As shown in Fig. 5, the dial I is provided with only a single scale, *i′*, for indicating horse-power; but in Fig. 10 a dial, I′, is shown as provided with four scales, $i^2$ $i^3$ $i^4$ $i^5$, each of which is marked to indicate the horse-power under a separate steam-pressure and at a given engine-speed. A dial thus marked will obviously serve, in connection with the pressure-indicator, to show the horse-power exerted by the engine when operating under steam-pressures commonly employed and when the engine is running at its regular or any given speed.

I claim as my invention—

1. The combination, with the steam-valve of an engine, of an indicator comprising a scale and an index-hand, one of which is movable relatively to the other, a part partaking of the motion of the valve constructed to engage and actuate the movable member of the indicator, means acting to carry the said movable part backwardly or into position with the index-hand at the zero-point of the scale, and retarding devices acting to check the speed of the said movable member of the indicator in its backward movement, substantially as described.

2. The combination, with the steam-valve of an engine, of an indicator comprising a scale and an index-hand, one of which is movable relatively to the other, a part partaking of the motion of the valve constructed to engage and actuate the movable member of the indicator, means acting to move the said movable part backward, and a dash-pot connected with and retarding the motion of the said movable member, substantially as described.

3. The combination, with the steam-valve of an engine, of an indicator comprising a scale and an index-hand, one of which is movable relatively to the other, a part partaking of the motion of the valve constructed to engage and actuate the movable member of the indicator, a spring acting to move the said movable member backward, and retarding devices acting to check the speed of the movable member in its backward movement under the action of the spring, substantially as described.

4. The combination, with the steam-valve of an engine, of an indicator comprising a dial-plate and a rotating index-hand, a part partaking of the motion of the valve constructed to act upon the index-hand to throw the latter in one direction, means acting to turn said index-hand in a direction the reverse of that in which it is moved by the movable part connected with the valve, and a dash-pot or equivalent retarding device giving to the said index-hand a slow backward movement, substantially as described.

5. The combination, with the steam-valve of an engine, of an indicator comprising a dial-plate, a revolving index-hand, a shaft sustaining the said index-hand, provided with a pinion, a gear-segment engaging the pinion, a spring applied to turn the hand backwardly, a movable part partaking of the motion of the valve acting upon said gear-segment, and a dash-pot or equivalent device acting to retard the motion of the gear-segment, substantially as described.

6. The combination, with the steam-valve of an engine, of an indicator comprising a dial and revolving index-hand, a shaft supporting the index-hand, provided with a pinion, a gear-segment engaging said pinion, a spring applied to the shaft to rotate the latter in a direction to carry the hand backwardly upon the scale, a vertically-sliding rod, L, engaging one end of the gear-segment, a dash-pot applied between the said rod L and a stationary support, and a part partaking of the motion of the valve constructed to engage and actuate the rod L, substantially as described.

7. The combination, with the steam-valve of an engine, of an indicator comprising a scale and an index-hand, one of which is movable relatively to the other, a movable part, as rod L, connected with the movable member of the indicator, a part partaking of the motion of the valve constructed to engage and actuate the said movable part, and a dash-pot connecting said movable part with a stationary support, said dash-pot consisting of a cylinder open at one end and a piston sliding in the cylinder and provided with an inwardly-opening valve, substantially as and for the purpose set forth.

8. The combination, with the scale and index-hand of an indicator and a vertically-movable rod, L, actuating the movable member of the indicator, of a part partaking of the motion of the valve constructed to engage and move vertically the said rod L, and an eccentric, P, engaging a projection or pin upon the said rod L, substantially as described.

9. The combination, with a steam-valve of an engine, of an indicator comprising an index-hand actuated by the valve, and a scale marked to show the horse-power developed by the engine under a given steam-pressure and a given speed of piston or number of revolutions of engine per minute, substantially as described.

10. The combination, with the steam-valve of an engine, of an indicator comprising an index-hand actuated by the said valve, and a series of scales marked to indicate the horse-power under two or more different steam-pressures, substantially as described.

In testimony that I claim the foregoing as my invention I affix my signature in presence of two witnesses.

ALBERT L. IDE.

Witnesses:
CHAS. A. ORR,
H. I. IDE.